United States Patent [19]

Soon-Fu

[11] Patent Number: 4,658,869

[45] Date of Patent: Apr. 21, 1987

[54] COMBINATION TIRE INFLATOR, GAUGE AND DEFLATOR

[76] Inventor: Hwang Soon-Fu, 40, Hsing Yu St., Taipei, Taiwan

[21] Appl. No.: 860,611

[22] Filed: May 7, 1986

[51] Int. Cl.$^4$ .......................... B60C 29/12; B65B 3/26
[52] U.S. Cl. ........................................ 141/98; 141/83; 141/38; 152/415; 73/146.8; 137/227
[58] Field of Search ............ 152/415; 73/146.8; 137/223, 227, 625.69, 625.25; 141/98, 38, 197, 83

[56] References Cited

U.S. PATENT DOCUMENTS

| | | | |
|---|---|---|---|
| 1,420,997 | 6/1922 | Freeman | 73/146.8 X |
| 1,666,283 | 4/1928 | Farley | 73/146.8 X |
| 1,818,178 | 8/1931 | Weisberg | 137/227 X |
| 2,047,405 | 7/1936 | Byars | 137/227 |
| 2,320,042 | 5/1943 | McMahan | 152/415 X |
| 3,429,332 | 2/1969 | Mazeika | 137/227 |
| 3,860,054 | 1/1975 | Prottey | 152/415 |
| 3,866,654 | 2/1975 | Dusquesne | 152/415 X |
| 4,068,690 | 1/1978 | Wyman | 152/415 |
| 4,116,245 | 9/1978 | Ayers | 141/98 |

FOREIGN PATENT DOCUMENTS 1210133 10/1970 United Kingdom ............... 152/415

Primary Examiner—Stephen Marcus
Assistant Examiner—Ernest G. Cusick

[57] ABSTRACT

An air inflator includes a double-cylinder body having a first cylinder having its one end connected with a compressed air adapter for supplying a compressed air therein and having its another end connected with an air filling applicator adapted to connect with a tire valve for filling compressed air into the tire, and a second cylinder fluidically communicated with the first cylinder and mounted with a pressure gauge thereon. The first cylinder is formed with an actuating rod reciprocatively moved in the first cylinder for controlling the air flow for filling a tire, or for sensing a pressure gauge for measuring air pressure, or for releasing excess air upon the adjustable depression of a handle pivotedly mounted on the body.

3 Claims, 7 Drawing Figures

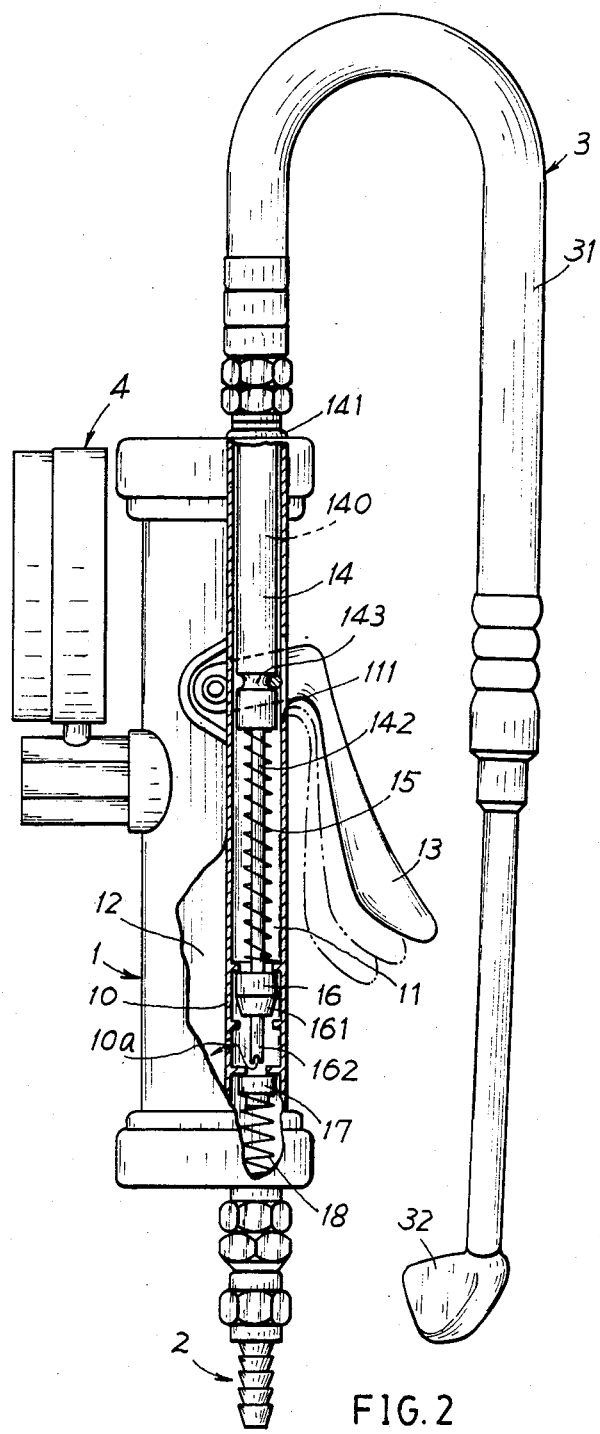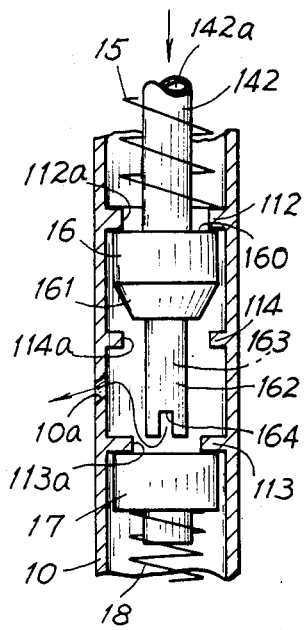
FIG. 2
FIG. 5

COMBINATION TIRE INFLATOR, GAUGE AND DEFLATOR

BACKGROUND OF THE INVENTION

Conventional tire inflators always include an air applicator having mounted a pressure gauge thereon for measuring the pressure of the filled tire and a filling valve for filling compressed air into a tire. These do not provide an air releasing device directly on the inflator and any excess air must be discharged by removing such an inflator from a tire and causes operation inconvenience for a user.

The present inventor has found this defect and invented the present invention which overcomes these deficiences.

SUMMARY OF THE INVENTION

The object of the present invention is to provide an air inflator including a double-cylinder body, a compressed-air adaptor connected with a compressed air source, and an air filling applicator connected with a filling valve such as of a tire, in which, the double-cylinder body includes a first cylinder having a side vent formed thereon for releasing the excess air filled into a tire and a second cylinder mounted with a pressure gauge for measuring the pressure of a tire being inflated, such that a tire can be filled with air therein under a suitable pressure and in a quicker and more convenient way since the excess air can be discharged from the first cylinder immediately and directly.

BRIEF DESCRIPTION OF THE DRAWINGS

FIG. 2 is a partial sectional drawing of the present invention.

FIG. 5 is a partial sectional drawing of the first cylinder of the present invention.

DETAILED DESCRIPTION

Figure 1:
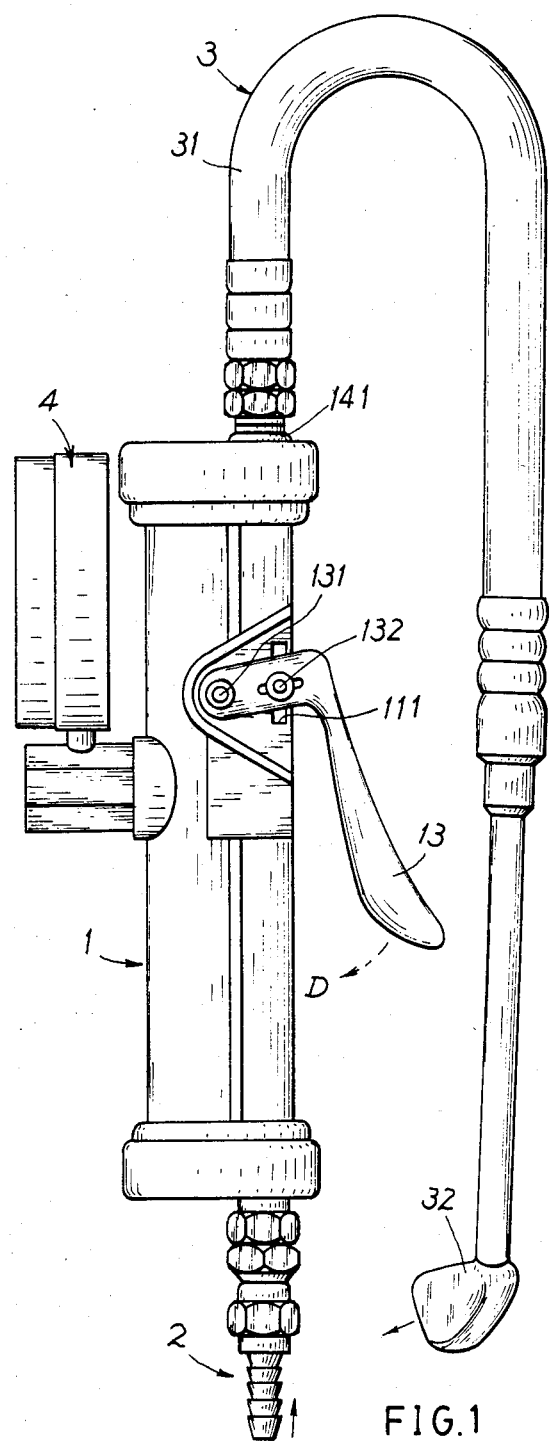
FIG. 1 is an illustration of the present invention.

As shown in the figures, the present invention comprises: a double-cylinder body 1, a compressed-air adapter 2 fluidically communicated with a compressed-air source and connected at one side of the body 1, an air filling applicator 3 connected at the other side of the body 1 adapted for filling compressed air into a tire valve (not shown) when connected with the applicator 3, and a pressure gauge 4 mounted on body 1.

The double-cylinder body 1 includes a first cylinder 11 having one end connected with the compressed-air adaptor 2 and having the other end thereof movably connected with the air filling applicator 3, a second cylinder 12 fluidically communicated with the pressure gauge 4 adjacent to the first cylinder 11 as partitioned by a wall 10, a levering handle 13 pivotedly on the body 1, a hollow actuating rod 14 reciprocatively moved within the first cylinder 11 and having its outer end 141 connected with a flexible hose 31 of the air filling applicator 3 of which the other end of hose 31 is connected with a filling valve 32 adapted for filling air into tire, an upper hollow plug 16 protruding downwards from the actuating rod 14 retained by upper spring 15 and a lower plug 17 retained by a lower spring 18.

The first cylinder 11 has its upper end reciprocatively jacketed with a hollow actuating rod 14 of which the diameter is slightly smaller than that of the first cylinder 11, and has its intermediate portion formed with a longitudinal side slot 111 for releasing air therefrom, and has its lower end formed with three valve seats including: an upper valve seat 112 operatively sealing the upper-side disk 160 of the upper plug 16 as tensioned upwards by a spring 15 jacketed on the hollow stem 142 connected between the upper plug 16 and the hollow actuating rod 14 having hollow portion 140 therein, a lower valve seat 113 opposite to the upper valve seat 112 operatively sealing the lower plug 17 as tensioned upwards by the lower spring 18, and an intermediate valve seat 114 located between the two valve seats 112, 113 operatively sealing a lower-side tapered portion 161 of upper plug 16 when the actuating rod 14 is moved downwards. A side hole 10a is formed on the partition wall 10 and positioned between the lower valve seat 113 and the intermediate valve seat 114 to direct air into the second cylinder 12 for pressure measurement in gauge 4.

An air-leading tube 162 having a hollow portion 163 and a lower-side recess opening 164 for flowing air therethrough is protruded downwards from the upper plug 16. The air-leading tube 162 has a length slightly larger than the distance spaced between the lower seat 113 and the intermediate seat 114 to allow the upper plug 16 to push the plug 17 downwards when the plug 16 is sealed on the intermediate seat 114. The length of the upper plug 16 should be slightly smaller than the distance between the upper seat 112 and the intermediate seat 114. The length of the plug 16 and the tube 162 should be less than the distance between the two seats 112, 113.

Figures 3, 6:
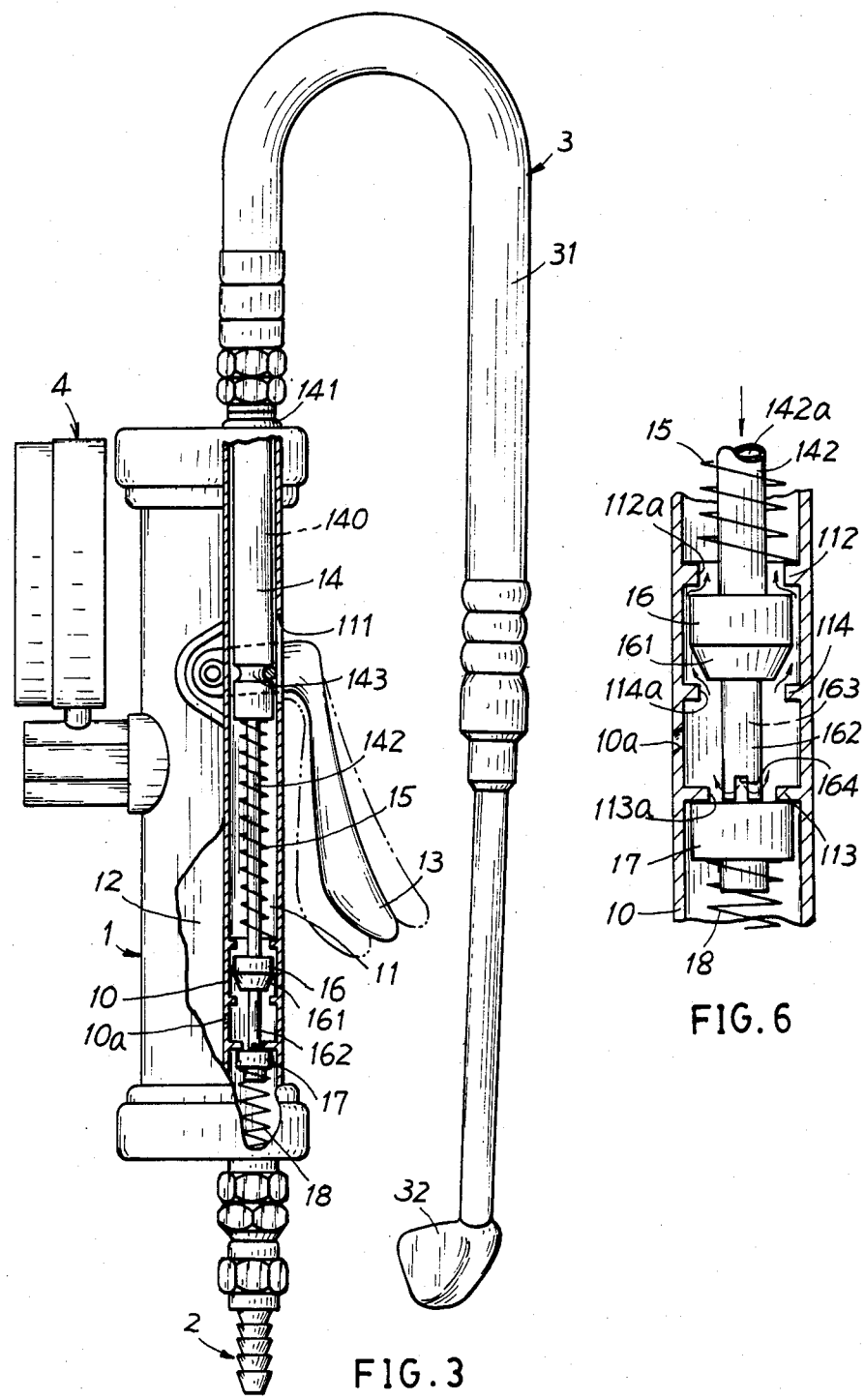
FIG. 3 is an illustration showing the releasing of air from the present invention.
FIG. 6 shows the first cylinder of FIG. 3 of the present invention.

The levering handle 13 is pivotedly mounted on the body 1 by a fulcrum pin 131 formed on the partition wall 10 and includes a depressing pin 132 movably provided on the handle serving as a "weight" between the "fulcrum" pin 131 and the "force" point of the handle and movably engaged with an annular groove 143 to operatively push the actuating rod 14 downwards upon the depression of the handle 13. The tube 162, plug 16, stem 142 and rod 14 all provide an aperture between the cylinder wall and all those elements to allow air flow as shown in FIGS. 6 and 3. The longitudinal side slot 111 also serves as a moving guide of the pin 132 to limit its sliding movement when depressing the handle 13, besides its function to release the air.

Figures 4, 7:
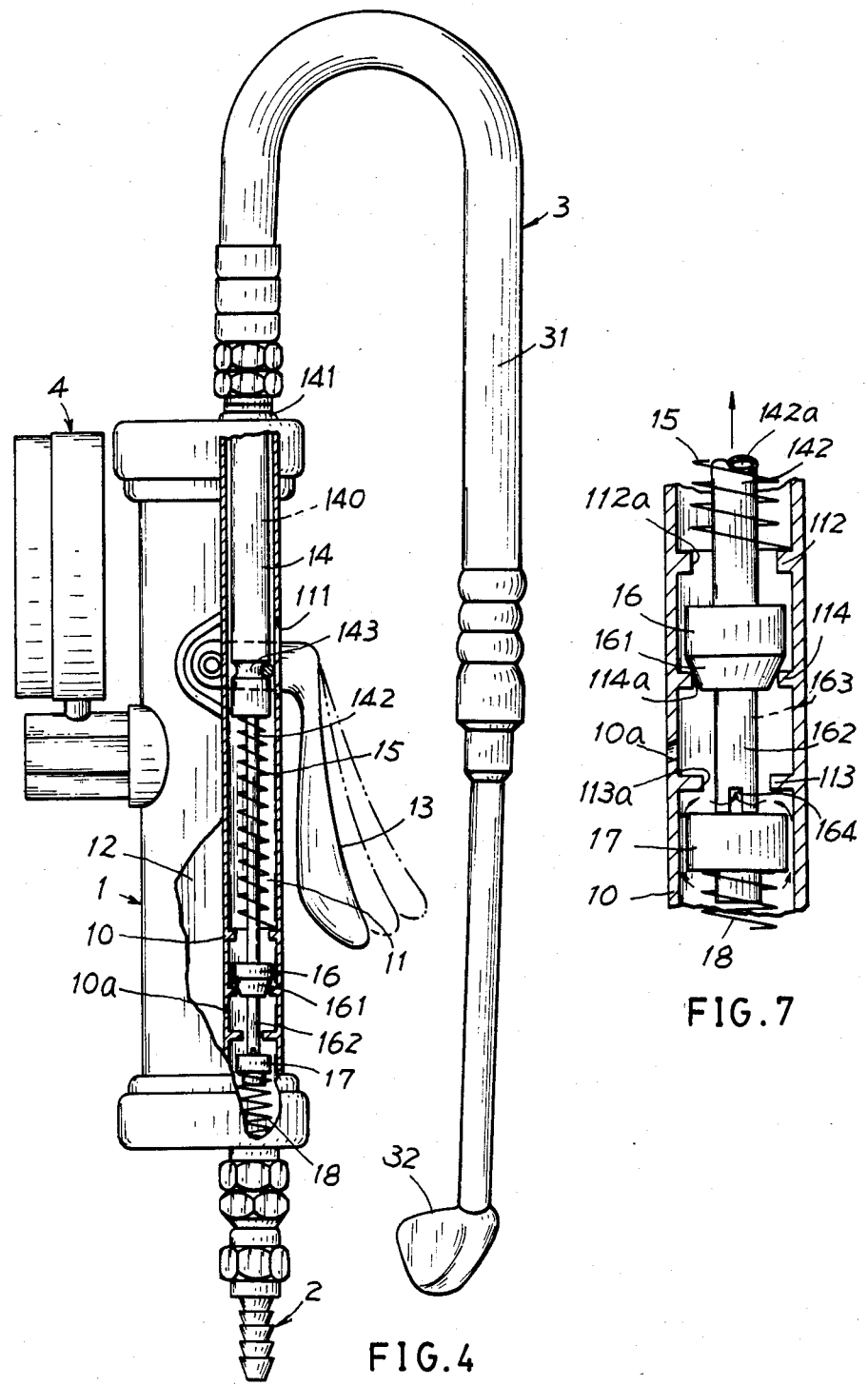
FIG. 4 shows the filling of air in accordance with the present invention.
FIG. 7 shows the first cylinder of FIG. 4 of the present invention.

When depressing the handle 13 to its utmost stroke, the rod having its annular groove 143 engaged with the pin 132 will be driven downwards (pin 132 slidingly moved along the slot 111) to allow the air-leading tube 162 pushing the lower plug 17 downwards to open the lower valve opening 113a and to allow the upper side tapered portion 161 of upper plug 16 sealing an intermediate valve opening 114a formed on the intermediate seat 114, so that the compressed air as shown by arrows in FIGS. 7 and 4 will be directed through an aperture between the plug 17 and the seat 113, the recess opening 164, hollow portion 163 of tube 162, hollow plug 16, hollow portion 142a of stem 142, hollow portion 140 of rod 14 towards the hose 31 and a tire (not shown) for its air filling. The tapered portion 161 of plug 16 already seals the valve seat 114 to prevent air releasing therethrough towards the slot 111.

For measuring air pressure during filling operation, the handle 13 is released without depression thereon to allow the upper spring 15 tensioning the rod 14 upwards to allow the plug 16 to seal the upper seat 112 without leaking air therethrough and the plug 17, as no longer being pushed by the tube 162, will be tensioned upwards by the lower spring 18 to seal the valve seat 113 to stop the air supply so that the air in tire will be fluidically communicated with the second cylinder 12 through hole 10a and the air pressure of tire will then be measured by the gauge 4 as mounted on the second cylinder 12 (FIGS. 5 and 2).

After the air in tire is measured to be too high and dangerous, the handle 13 is slightly depressed to push the rod downwards to move the upper plug 16 between the two seats 114 and 112 to allow excess air to discharge through the aperture between plug 16 and cylinder 11 and finally release from slot 111 as shown in FIGS. 6 and 3. Since the length of tube 162 and plug 16 is shorter than that between the seats 113, 112, the lower plug 17 will not be pushed downwards to stop further air supply for the convenience for releasing the excess air from tire.

Accordingly, this invention can be conveniently used for filling air into a tire and for measuring air pressure frequently during filling operation, and also for releasing the excess air simply by adjustably depressing the handle 13.

What is claimed is:

1. A triple-pass air inflator comprising:
   a double-cylinder body including a first cylinder having its one end connected with a compressed air adapter and having the other end thereof movably connected with an air filling applicator, a second cylinder partitioned from said first cylinder by a partition wall, a levering handle pivotedly mounted on said body and operatively moving a hollow actuating rod reciprocatively in said first cylinder, said actuating rod having its outer end connected with said air filling applicator; said compressed-air adapter connected with said first cylinder adapted to supply a compressed air therein from a compressed-air source; said air filling applicator including a flexible hose connected on the other end of said first cylinder and a filling valve adapted to connect with a valve on a tire for filling compressed air thereinto; and a pressure gauge mounted on said second cylinder and operatively fluidically communicated with said first cylinder through a hole formed on said partition wall;
   the improvement which comprises:
   said first cylinder having its upper end reciprocatively jacketed therein with a hollow actuating rod slightly smaller in diameter than said first cylinder, having its lower end formed with a lower valve seat, an intermediate valve seat and an upper valve seat, and having its intermediate portion formed with a longitudinal side slot for releasing air therethrough;
   said levering handle having a depressing pin movably formed on said handle and positioned between a fulcrum pin for pivotedly mounting said handle on said body and said handle, said depressing pin slidingly moving along said longitudinal side slot and movably engaging with an annular groove formed on said actuating rod adapted to push said rod downwards upon the depression of said handle;
   said actuating rod protruding downwards to connect an upper hollow plug by a hollow stem biased upwards by an upper spring jacketed on said hollow stem, said upper hollow plug having an upper-side disk operatively sealing said upper valve seat as tensioned by said upper spring and a lower-side tapered portion operatively sealing said intermediate valve seat upon an utmost depression of said handle to move said actuating rod downwards and having an air-leading tube formed with a recess opening on its lower end operatively pushing a lower plug to open an aperture between said lower plug and said lower valve seat, said lower plug as tensioned by a lower spring upwards to normally seal lower valve seat, said upper hollow plug having a length slightly smaller than a distance between said intermediate valve seat and said upper valve seat, wherein a length of said air-leading tube plus a length of said upper plug being less than a distance between said lower valve seat and said upper valve seat, said air-leading tube having a length slightly larger than the distance between said lower seat and said intermediate seat adapted to open said lower plug when said upper plug is downwardly sealing said intermediate seat, an aperture formed between said upper plug and said first cylinder adapted for releasing air through said air-leading tube, said upper plug, said hollow stem, said actuating rod to be discharged through said longitudinal side slot, whereby upon the depression of said handle to push said actuating rod downwards to open said lower plug and to seal said intermediate valve seat to direct compressed air through said recess opening of said air-leading tube, said hollow upper plug, said stem, said actuating rod, said air filling applicator towards a tire for air-filling; and upon the releasing of the handle, the upper plug will be biased to seal said upper valve seat to prevent air leakage therethrough and to direct air into said second cylinder for its pressure measurement; and upon slight depression of said handle, said upper plug is driven to locate between said intermediate valve seat and said upper valve sent to allow the excess air from tire releasing through said aperture between said upper plug and said first cylinder and discharging through said side slot.

2. An air inflator according to claim 1, wherein said hole on said partition wall is positioned between said lower valve seat and said intermediate valve seat to fluidically communicate said second cylinder with said first cylinder.

3. An air inflator according to claim 1, wherein said longitudinal side slot formed on said first cylinder serving for releasing excess air therethrough also limits the sliding movement of said depressing pin movably mounted on said levering handle and engaged with said annular groove of said actuating rod.

* * * * *